(12) United States Patent
Nakado et al.

(10) Patent No.: US 10,947,038 B2
(45) Date of Patent: *Mar. 16, 2021

(54) THERMAL INSULATING STRUCTURE

(71) Applicant: KAWASAKI JUKOGYO KABUSHIKI KAISHA, Kobe (JP)

(72) Inventors: Hiroki Nakado, Kakogawa (JP); Kazuto Gokan, Kobe (JP); Tatsuya Imai, Akashi (JP); Ryosuke Uraguchi, Kobe (JP); Osamu Muragishi, Kakogawa (JP); Takashi Koumoto, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/484,519

(22) PCT Filed: Feb. 2, 2018

(86) PCT No.: PCT/JP2018/003559
§ 371 (c)(1),
(2) Date: Aug. 8, 2019

(87) PCT Pub. No.: WO2018/147177
PCT Pub. Date: Aug. 16, 2018

(65) Prior Publication Data
US 2020/0002085 A1      Jan. 2, 2020

(30) Foreign Application Priority Data
Feb. 8, 2017   (JP) .............................. JP2017-021257

(51) Int. Cl.
*F16L 59/065*     (2006.01)
*B65D 90/06*      (2006.01)
(Continued)

(52) U.S. Cl.
CPC ................ *B65D 90/06* (2013.01); *E04B 1/80* (2013.01); *B32B 3/00* (2013.01); *F16L 59/065* (2013.01);
(Continued)

(58) Field of Classification Search
CPC .... Y10T 428/231; F16L 59/065; E04B 1/803; F17C 2203/0391; Y02B 80/12; F25D 2201/14
See application file for complete search history.

(56) References Cited

U.S. PATENT DOCUMENTS 10,378,696 B2 *   8/2019   Yamashiro ............ F16L 59/065

FOREIGN PATENT DOCUMENTS

| JP | S49-132776 U | 11/1974 |
| JP | S55-076287 A | 6/1980 |
| WO | 2015/125476 A1 | 8/2015 |

* cited by examiner

*Primary Examiner* — Alexander S Thomas
(74) *Attorney, Agent, or Firm* — Oliff PLC

(57) ABSTRACT

A thermal insulating structure includes: at least two retainers that protrude from a to-be-insulated surface exposed to a vacuum space; at least two first multilayer vacuum insulating sheets adjacent to each other with the retainers positioned therebetween, the insulating sheets covering the to-be-insulated surface; at least one second multilayer vacuum insulating sheet that extends between the retainers along a boundary between the first multilayer vacuum insulating sheets in a manner to cover the boundary; at least two third multilayer vacuum insulating sheets that are adjacent to each other with the retainers positioned therebetween, the at least two third multilayer vacuum insulating sheets covering the first multilayer vacuum insulating sheets and the second multilayer vacuum insulating sheet; and a keep plate that is fixed to the retainers and holds the first multilayer vacuum
(Continued)

insulating sheets, the second multilayer vacuum insulating sheet, and the third multilayer vacuum insulating sheets.

6 Claims, 6 Drawing Sheets

(51) Int. Cl.
    *E04B 1/80*        (2006.01)
    *B32B 3/00*        (2006.01)

(52) U.S. Cl.
    CPC ............... *F17C 2203/0391* (2013.01); *F17C 2203/0646* (2013.01); *F17C 2209/228* (2013.01); *Y10T 428/231* (2015.01)

THERMAL INSULATING STRUCTURE

TECHNICAL FIELD

The present invention relates to a thermal insulating structure including a multilayer vacuum insulating sheet.

BACKGROUND ART

Conventionally, there is a known thermal insulating structure in which a surface to be thermally insulated (hereinafter, a "to-be-insulated surface") and exposed to a vacuum space is covered by a multilayer vacuum insulating sheet. For example, FIG. 2 of Patent Literature 1 discloses a thermal insulating structure in which a multilayer vacuum insulating sheet is fixed to a to-be-insulated surface by bolts. Specifically, in the thermal insulating structure, the multilayer vacuum insulating sheet is provided with a plurality of through-holes, and the to-be-insulated surface is provided with a plurality of screw holes. The bolts are screwed into the screw holes through the through-holes of the multilayer vacuum insulating sheet, and the multilayer vacuum insulating sheet is held by washers that are engaged with the heads of the bolts.

CITATION LIST

Patent Literature

PTL 1: Japanese Laid-Open Utility Model Application Publication No. S49-132776

SUMMARY OF INVENTION

Technical Problem

However, the multilayer vacuum insulating sheet is formed by suturing a large number of independent flexible layers together. For this reason, it is difficult to form through-holes in the multilayer vacuum insulating sheet at precise positions.

In view of the above, an object of the present invention is to provide a thermal insulating structure that makes it possible to reduce the number of through-holes formed in a multilayer vacuum insulating sheet.

Solution to Problem

In order to solve the above-described problems, a thermal insulating structure according to one aspect of the present invention includes: at least two retainers that protrude from a to-be-insulated surface exposed to a vacuum space; at least two first multilayer vacuum insulating sheets that are adjacent to each other with the retainers positioned therebetween, the at least two first multilayer vacuum insulating sheets covering the to-be-insulated surface; at least one second multilayer vacuum insulating sheet that extends between the retainers along a boundary between the first multilayer vacuum insulating sheets in a manner to cover the boundary; at least two third multilayer vacuum insulating sheets that are adjacent to each other with the retainers positioned therebetween, the at least two third multilayer vacuum insulating sheets covering the first multilayer vacuum insulating sheets and the second multilayer vacuum insulating sheet; and a keep plate that is fixed to the retainers and holds the first multilayer vacuum insulating sheets, the second multilayer vacuum insulating sheet, and the third multilayer vacuum insulating sheets.

According to the above-described configuration, the retainers are disposed by utilizing the boundary between the first multilayer vacuum insulating sheets and the boundary between the third multilayer vacuum insulating sheets. This makes it possible to reduce the number of through-holes formed in the first multilayer vacuum insulating sheets and the third multilayer vacuum insulating sheets. In addition, in the above configuration, the band-shaped second multilayer vacuum insulating sheet extending along the boundary between the first multilayer vacuum insulating sheets is interposed between the boundary between the first multilayer vacuum insulating sheets and the boundary between the third multilayer vacuum insulating sheets. Therefore, even if there is a gap between the second multilayer vacuum insulating sheet and the first multilayer vacuum insulating sheets, the third multilayer vacuum insulating sheets prevent the to-be-insulated surface from being exposed through the gap and the boundary between the first multilayer vacuum insulating sheets. Moreover, a path from the boundary between the first multilayer vacuum insulating sheets to the boundary between the third multilayer vacuum insulating sheets is formed in a manner to bypass both end portions of the band-shaped second multilayer vacuum insulating sheet in its width direction, i.e., the path is formed in a labyrinth-like manner. In this way, the length of the path can be made long. This makes it possible to obtain high thermal insulating performance.

The first multilayer vacuum insulating sheets adjacent to each other may be joined to the to-be-insulated surface at least in a vicinity of each retainer by a pair of first hook/loop fasteners. The second multilayer vacuum insulating sheet may be, between the retainers, joined to the first multilayer vacuum insulating sheets adjacent to each other by a pair of second hook/loop fasteners. The third multilayer vacuum insulating sheets adjacent to each other may be, between the retainers, joined to the second multilayer vacuum insulating sheet by a pair of third hook/loop fasteners. According to this configuration, the first multilayer vacuum insulating sheets can be prevented from being spaced apart from the to-be-insulated surface by the first hook/loop fasteners. Further, the second multilayer vacuum insulating sheet serves to integrate the adjacent first multilayer vacuum insulating sheets and the adjacent third multilayer vacuum insulating sheets together. This makes it possible to prevent the formation of a gap between multilayer vacuum insulating sheets that overlap each other, and to prevent the multilayer vacuum insulating sheets from being displaced from each other in a direction parallel to the to-be-insulated surface.

In the pair of first hook/loop fasteners, one first hook/loop fastener may be attached to a fixed plate by a rivet, the fixed plate overlapping a base plate joined to the to-be-insulated surface. Each of the retainers may include a screw shaft and a non-circular cross section portion, the screw shaft being screwed into a screw hole formed in the base plate, the non-circular cross section portion being adjacent to the screw shaft. The fixed plate may be provided with a non-circular rotation prevention hole that is engaged with the non-circular cross section portion. According to this configuration, each retainer and the fixed plate are unable to rotate relative to each other. The fixed plate is hard to rotate also relative to the first multilayer vacuum insulating sheets owing to the first hook/loop fasteners. Therefore, the retainer is also hard to rotate, and thus it can be expected that the retainer is prevented from coming off.

Each of the base plate and the fixed plate may have a circular shape, and the first hook/loop fastener attached to the fixed plate may have a circular shape. According to this configuration, whatever orientation the fixed plate is in, substantially the same fastening strength can be obtained between the first hook/loop fasteners.

The at least one second multilayer vacuum insulating sheet may include three or more second multilayer vacuum insulating sheets, and the second multilayer vacuum insulating sheets may be adjacent to each other with each retainer positioned therebetween. According to this configuration, it is unnecessary to form through-holes, in which the retainers are inserted, in the second multilayer vacuum insulating sheets.

The retainers may form a plurality of retainer lines. The thermal insulating structure may include a plurality of the keep plates. Each of the keep plates may be a bar-shaped member whose both end portions are engaged with the respective retainers of the retainer lines that are adjacent to each other. According to this configuration, the central portions of the first multilayer vacuum insulating sheets and the central portions of the third multilayer vacuum insulating sheets can also be held by the keep plates. In addition, each keep plate can be fixed to the retainers by merely bringing both end portions of the keep plate into engagement with the retainers. This makes it possible to readily fix the keep plates.

A thermal insulating structure according to another aspect of the present invention includes: at least one retainer that protrudes from a to-be-insulated surface exposed to a vacuum space; at least two first multilayer vacuum insulating sheets that are adjacent to each other in a first direction with the retainer positioned therebetween, the at least two first multilayer vacuum insulating sheets covering the to-be-insulated surface; at least two second multilayer vacuum insulating sheets that are adjacent to each other in a second direction orthogonal to the first direction with the retainer positioned therebetween, the at least two second multilayer vacuum insulating sheets extending along a boundary between the first multilayer vacuum insulating sheets in a manner to cover the boundary; at least two third multilayer vacuum insulating sheets that are adjacent to each other in the first direction with the retainer positioned therebetween, the at least two third multilayer vacuum insulating sheets covering the first multilayer vacuum insulating sheets and the second multilayer vacuum insulating sheets; and a keep plate that is fixed to the retainer and holds the first multilayer vacuum insulating sheets, the second multilayer vacuum insulating sheets, and the third multilayer vacuum insulating sheets. This configuration makes it possible to provide the same advantageous effects as those provided by the thermal insulating structure according to the above-described one aspect.

Advantageous Effects of Invention

The present invention makes it possible to reduce the number of through-holes formed in a multilayer vacuum insulating sheet.

DESCRIPTION OF EMBODIMENTS

Figure 1:
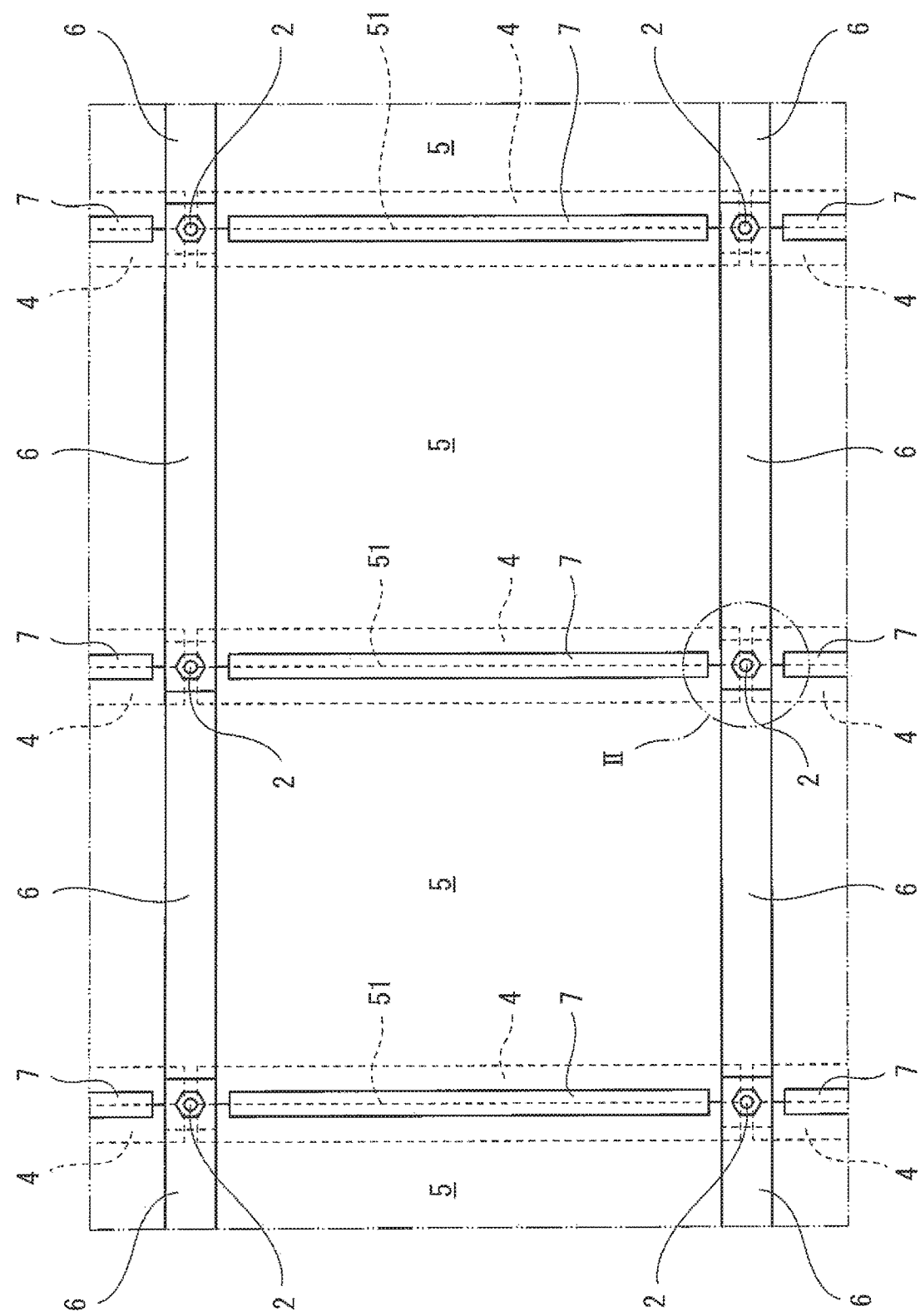
FIG. 1 is a plan view of a thermal insulating structure according to one embodiment of the present invention.
Figure 2:
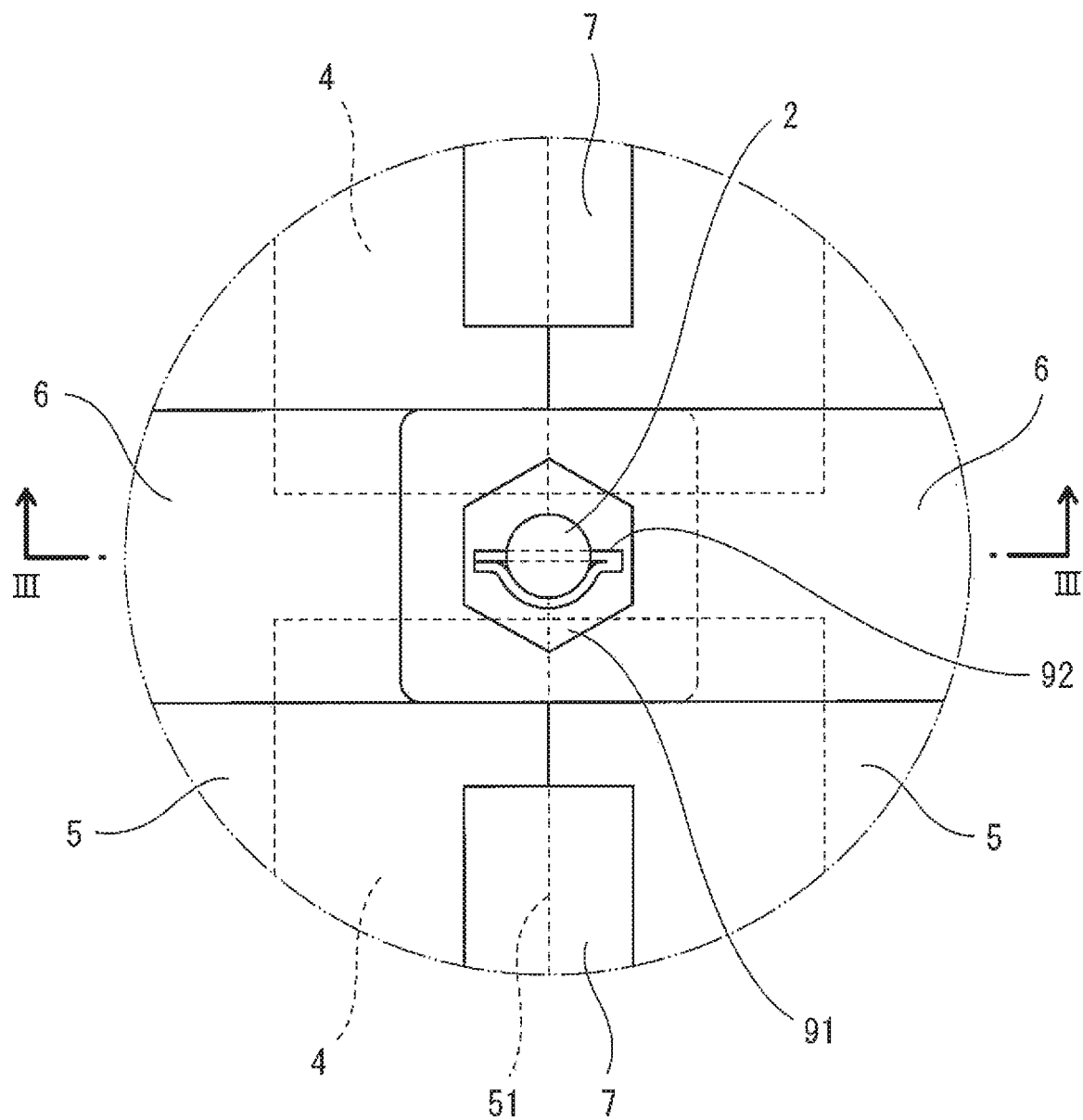
FIG. 2 is an enlarged view of a portion denoted by II in FIG. 1.
Figure 3:
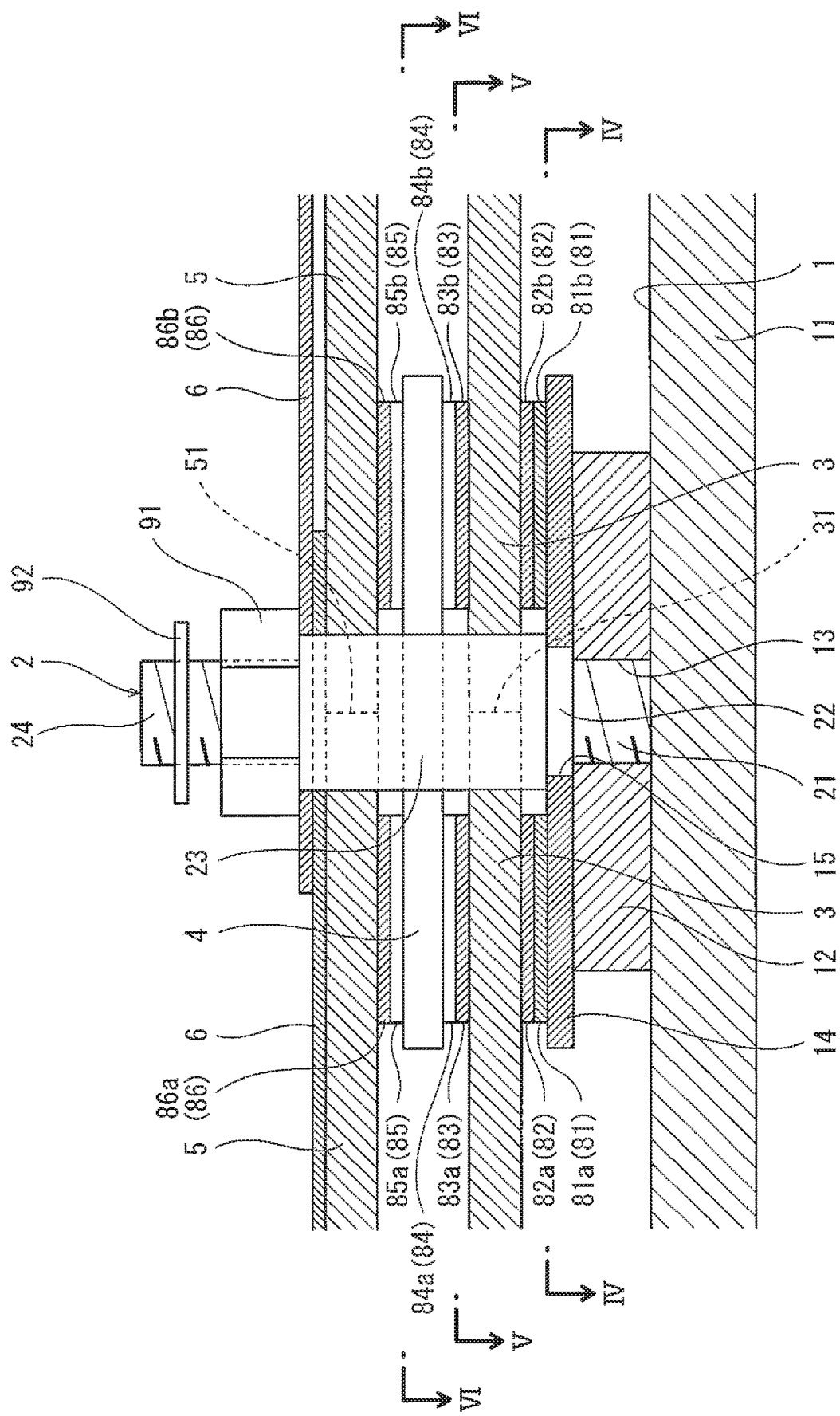
FIG. 3 is a sectional view taken along line III-III of FIG. 2.

FIGS. 1 to 3 show a thermal insulating structure according to one embodiment of the present invention. The thermal insulating structure is intended for preventing heat from entering and reaching a to-be-insulated surface 1 (see FIG. 3) exposed in a vacuum space or preventing heat from being released from the to-be-insulated surface 1.

A structural body 11 including the to-be-insulated surface 1 is, for example, a spherical or cylindrical tank. In this case, the to-be-insulated surface 1 is a curved surface. For example, the tank is a double-shell tank including an inner shell and an outer shell, between which a vacuum space is formed, and the to-be-insulated surface 1 is the outer surface of the inner shell. Alternatively, the to-be-insulated surface 1 may be a flat surface. The structural body 11 including the to-be-insulated surface 1 is not limited to a tank, but may be any structural body.

At least two retainers 2 protrude from the to-be-insulated surface 1. In the present embodiment, since the to-be-insulated surface 1 is a wide surface, a large number of retainers 2 are arranged in a manner to form three straight lines parallel to each other. In other words, in the present embodiment, retainer lines parallel to each other are formed. Each retainer line includes at least two retainers 2. However, the retainer lines need not be parallel to each other. In a case where the to-be-insulated surface 1 is a narrow surface, the number of retainer lines may be one.

Further, in the present embodiment, the to-be-insulated surface 1 is covered by at least four first multilayer vacuum insulating sheets 3. Each of the first multilayer vacuum insulating sheets 3 has a wide width, and is rectangular extending in the same direction as the retainer lines. The first multilayer vacuum insulating sheets 3 are arranged in a direction orthogonal to the retainer lines, and are adjacent to each other with at least two retainers 2 positioned therebetween. However, the shape of each first multilayer vacuum insulating sheet 3 need not be rectangular, but may be, for example, trapezoidal or triangular. In a case where the to-be-insulated surface 1 is a narrow surface, at least two first multilayer vacuum insulating sheets 3 may be provided on the narrow surface.

Figure 5:
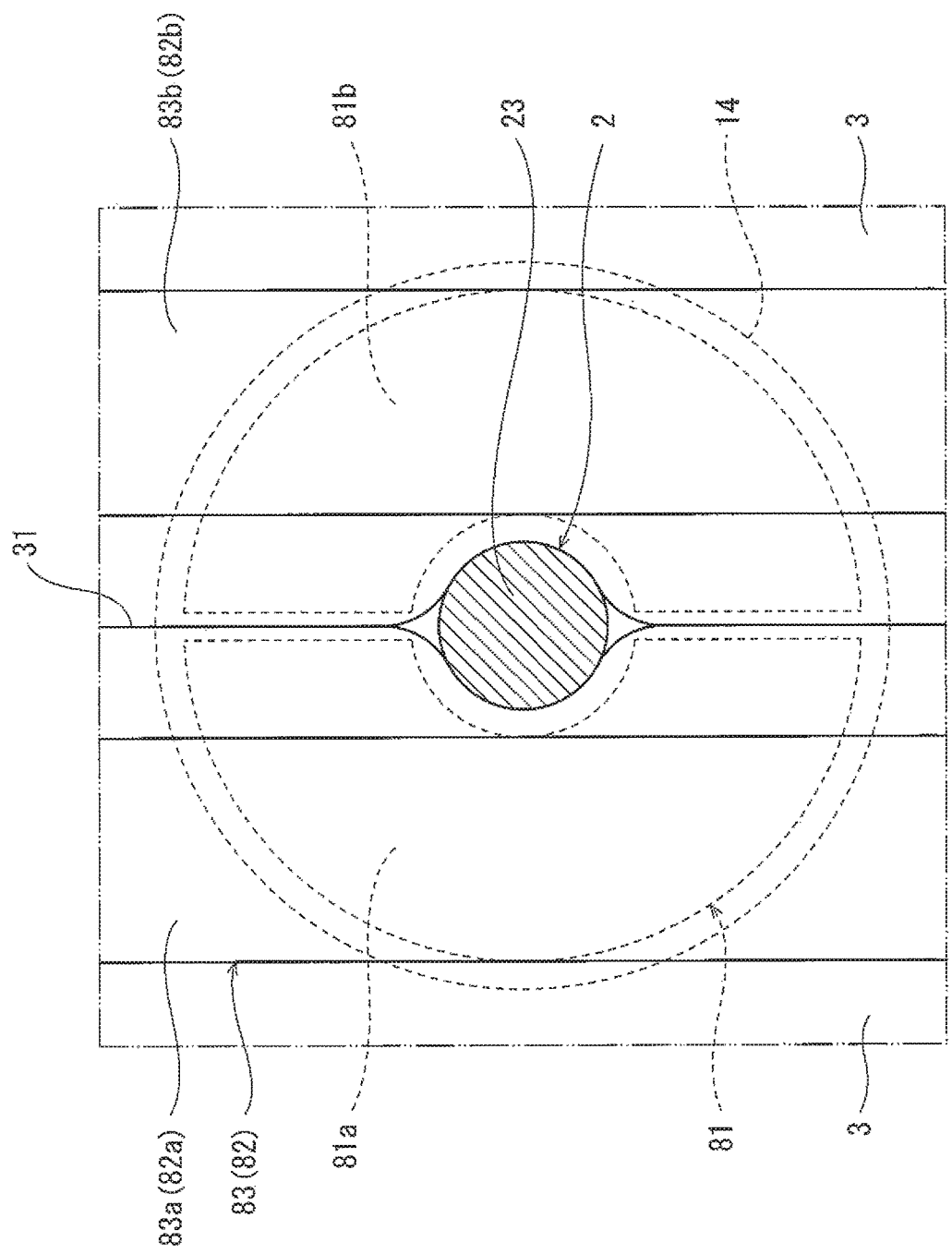
FIG. 5 is a plan view taken along line V-V of FIG. 3.

In the present embodiment, end surfaces of the first multilayer vacuum insulating sheets 3 adjacent to each other are in surface contact with each other, such that no gap is formed between the first multilayer vacuum insulating sheets 3. Accordingly, as shown in FIG. 5, at a position where each retainer 2 is present, end portions of the first multilayer vacuum insulating sheets 3 in their width direction are pushed against the retainer 2 and thereby deformed. However, a gap may be formed between the adjacent first multilayer vacuum insulating sheets 3.

As shown in FIGS. 1 to 3, each of boundaries 31 between the adjacent first multilayer vacuum insulating sheets 3 is covered by three or more second multilayer vacuum insulating sheets 4. The term "boundary 31" herein refers to a region between facing sides of first multilayer vacuum insulating sheets 3. Each of the second multilayer vacuum insulating sheets 4 is a band-shaped sheet having a narrow width and extending between retainers 2 along the boundary 31 between the first multilayer vacuum insulating sheets 3.

For example, desirably, each second multilayer vacuum insulating sheet 4 has a width of ⅓ or less of the width of the first multilayer vacuum insulating sheet 3. If the width of each second multilayer vacuum insulating sheet 4 is narrow, a fixing structure for fixing the second multilayer vacuum insulating sheet 4 can be simplified.

Figure 6:
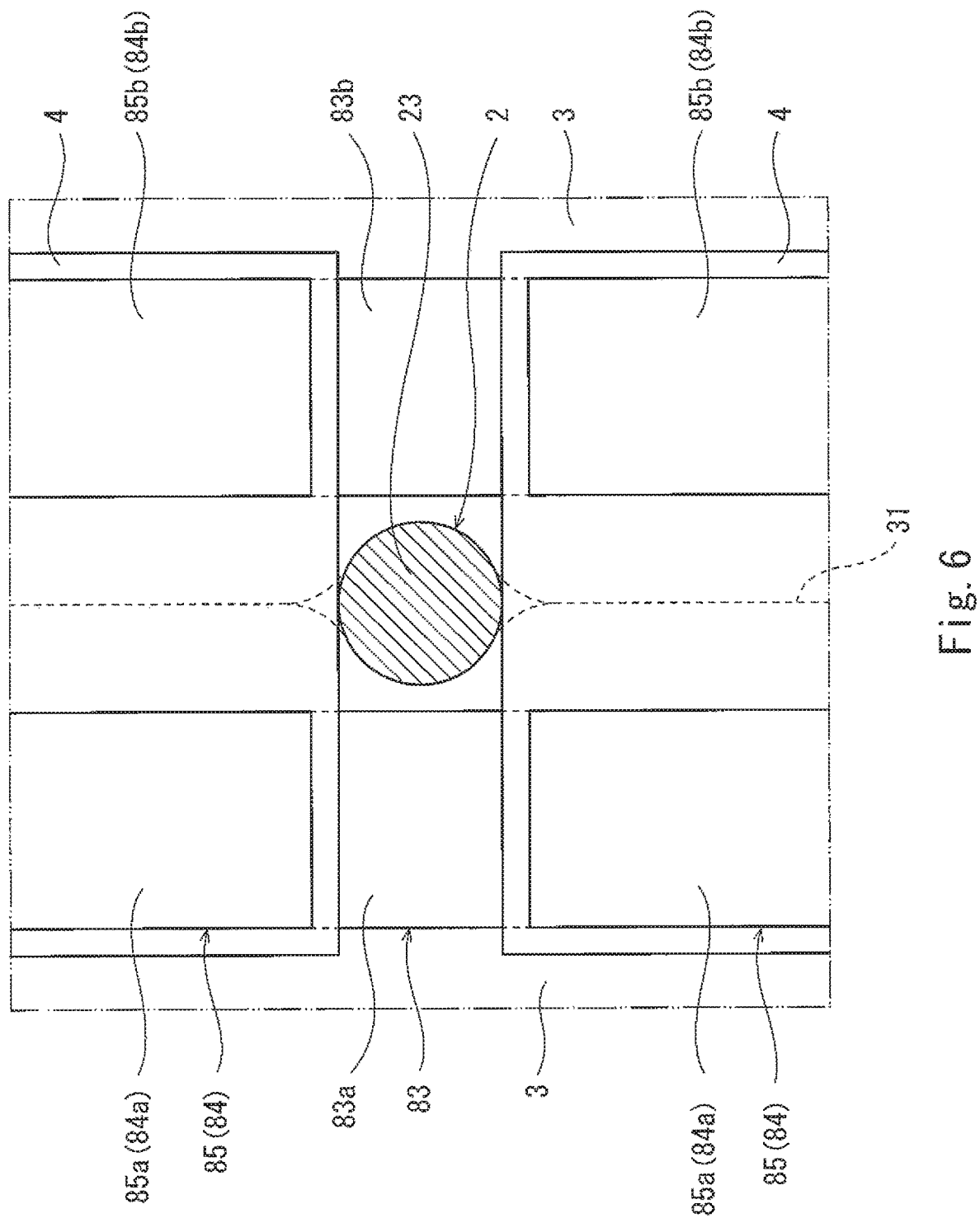
FIG. 6 is a plan view taken along line VI-VI of FIG. 3.

The second multilayer vacuum insulating sheets 4 are adjacent to each other in their longitudinal direction with each retainer 2 positioned therebetween. In the present embodiment, as shown in FIG. 6, the distance between the adjacent second multilayer vacuum insulating sheets 4 is greater than or equal to the thickness of the retainer 2. For this reason, end portions of the second multilayer vacuum insulating sheets 4 in their longitudinal direction are not deformed. However, the distance between the adjacent second multilayer vacuum insulating sheets 4 may be less than the thickness of the retainer 2, and the end portions of the second multilayer vacuum insulating sheets 4 in their longitudinal direction may be pushed against the retainer 2 and thereby deformed.

As shown in FIGS. 1 to 3, the present embodiment is further provided with at least four third multilayer vacuum insulating sheets 5, which cover the first multilayer vacuum insulating sheets 3 and the second multilayer vacuum insulating sheets 4. The layout of the third multilayer vacuum insulating sheets 5 is the same as the layout of the first multilayer vacuum insulating sheets 3. However, the layout of the third multilayer vacuum insulating sheets 5 may be different from the layout of the first multilayer vacuum insulating sheets 3.

That is, each of the third multilayer vacuum insulating sheets 5 has a wide width and is rectangular extending in the same direction as the retainer lines. The third multilayer vacuum insulating sheets 5 are arranged in a direction orthogonal to the retainer lines, and are adjacent to each other with at least two retainers 2 positioned therebetween. Boundaries 51 between the third multilayer vacuum insulating sheets 5 are positioned overlapping the second multilayer vacuum insulating sheets 4. To be more specific, each of the boundaries 51 between the third multilayer vacuum insulating sheets 5 is positioned immediately above a corresponding one of the boundaries 31 between the first multilayer vacuum insulating sheets 3, with the second multilayer vacuum insulating sheets 4 positioned therebetween. In the present embodiment, aluminum tape 7 is affixed to the third multilayer vacuum insulating sheets 5 adjacent to each other in a manner to cover the boundary 51 therebetween.

The third multilayer vacuum insulating sheets 5 entirely overlap the first multilayer vacuum insulating sheets 3 in their width direction. However, in a case where a plurality of first multilayer vacuum insulating sheets 3 and a plurality of third multilayer vacuum insulating sheets 5 are arranged in their longitudinal direction between the retainer lines, it is desirable that the third multilayer vacuum insulating sheets 5 and the first multilayer vacuum insulating sheets 3 be arranged in a staggered manner in their longitudinal direction.

In the present embodiment, end surfaces of the third multilayer vacuum insulating sheets 5 adjacent to each other are in surface contact with each other, such that no gap is formed between the third multilayer vacuum insulating sheets 5. Accordingly, similar to the case of the first multilayer vacuum insulating sheets 3 shown in FIG. 5, at a position where each retainer 2 is present, end portions the third multilayer vacuum insulating sheets 5 in their width direction are pushed against the retainer 2 and thereby deformed. However, a gap may be formed between the adjacent third multilayer vacuum insulating sheets 5.

Each of the first multilayer vacuum insulating sheets 3, the second multilayer vacuum insulating sheets 4, and the third multilayer vacuum insulating sheets 5 is formed by suturing a large number of independent flexible layers together. The number of layers forming each first multilayer vacuum insulating sheet 3, the number of layers forming each second multilayer vacuum insulating sheet 4, and the number of layers forming each third multilayer vacuum insulating sheet 5 may be the same as each other, or may be different from each other. However, in order to reduce the gap between each of the first multilayer vacuum insulating sheets 3 and a corresponding one of the third multilayer vacuum insulating sheets 5, it is desirable to set the number of layers forming each second multilayer vacuum insulating sheet 4 to be less than the number of layers forming each first multilayer vacuum insulating sheet 3 and the number of layers forming each third multilayer vacuum insulating sheet 5. For example, the number of layers forming each first multilayer vacuum insulating sheet 3 and the number of layers forming each third multilayer vacuum insulating sheet 5 are 20 to 60, and the number of layers forming each second multilayer vacuum insulating sheet 4 is 10 to 30. It should be noted that each of the first to third multilayer vacuum insulating sheets 3 to 5 may be divided up into two multilayer vacuum insulating sheets, each of which is formed by a small number of layers (e.g., 10 to 30 layers), and the two multilayer vacuum insulating sheets may be joined to each other by a pair of hook/loop fasteners.

To be more specific, the large number of layers forming each of the multilayer vacuum insulating sheets include radiation shield films and spacers that are stacked alternately. Each radiation shield film is formed by, for example, vapor-depositing aluminum (or gold or silver) onto the surface of a resin sheet. Each spacer is a sheet having low thermal conductivity. Such a sheet may be made of, for example, a resin net, woven fabric, non-woven fabric, paper, or a glass fiber material.

Each of the above-described retainers 2 is a bar-shaped member extending vertically from the to-be-insulated surface 1. For example, each retainer 2 is made of, but not limited to, glass fiber reinforced plastic (GFRP).

In the present embodiment, base plates 12 are joined to the to-be-insulated surface 1 at positions corresponding to the respective retainers 2. For example, the base plates 12 are joined to the to-be-insulated surface 1 by welding or fixing by screws.

Each of the base plates 12 has a circular shape, and a screw hole 13 is formed in its center. Alternatively, the base plates 12 may be eliminated, and screw holes 13 may be directly formed in the to-be-insulated surface 1. The shape of each base plate 12 need not be circular, but may be polygonal, such as rectangular or hexagonal.

Each retainer 2 includes, at one end thereof, a first screw shaft 21 screwed into a corresponding one of the screw holes 13, and includes, at the other end, a second screw shaft 24. Each retainer 2 further includes a non-circular cross section portion 22 and a larger diameter portion 23. The non-circular cross section portion 22 is adjacent to the first screw shaft 21, and the larger diameter portion 23 is positioned between the non-circular cross section portion 22 and the second screw shaft 24.

However, fixing each retainer 2 to the to-be-insulated surface 1 need not be done by a screwing structure. For example, a flange may be formed on one end of each retainer 2, and the flange may be sandwiched between the to-beinsulated surface 1 and a corresponding one of the base plates 12. In a case where each retainer 2 is made of metal, each retainer 2 may be fixed to the to-be-insulated surface 1 by welding.

Figure 4:
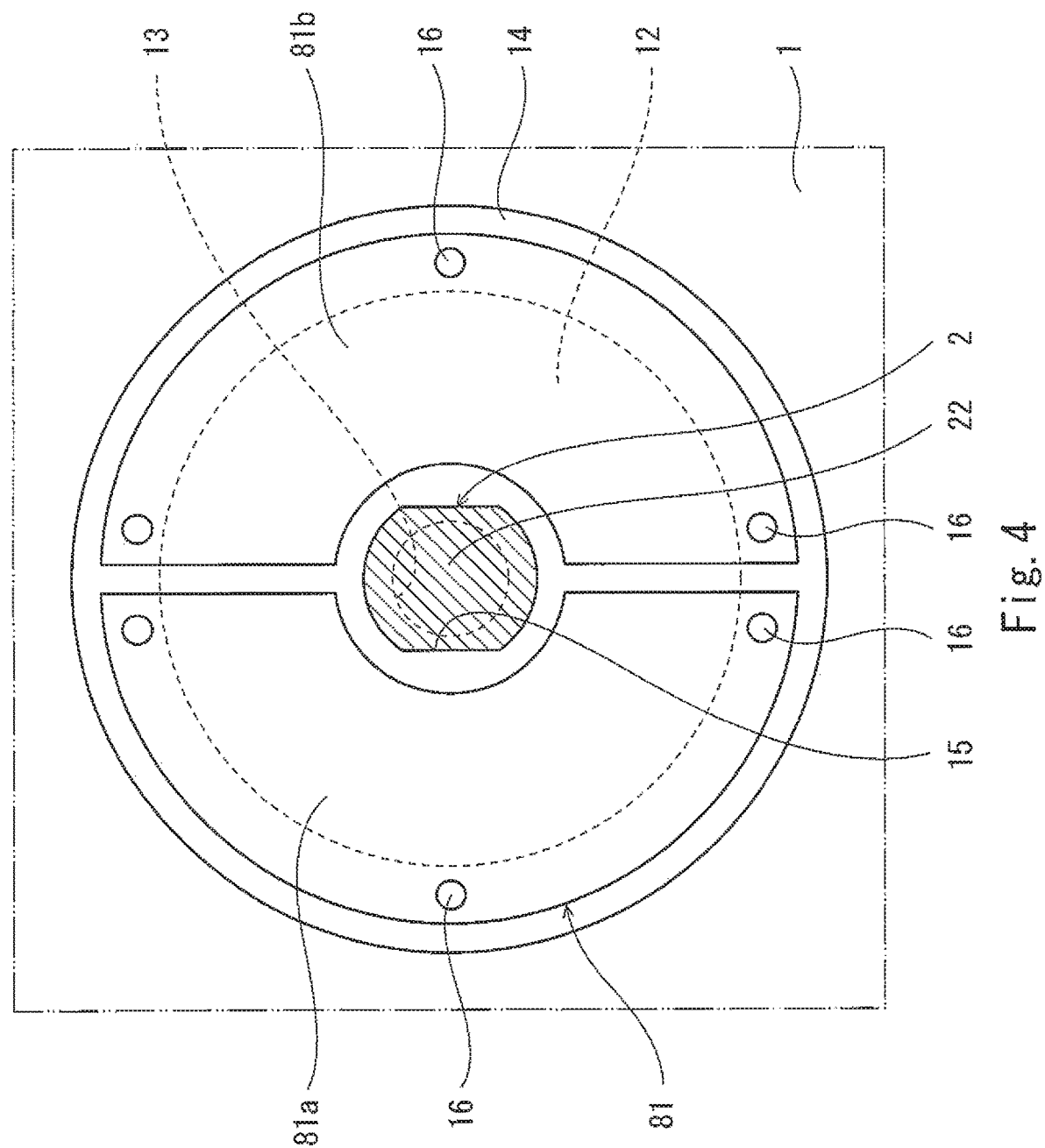
FIG. 4 is a plan view taken along line IV-IV of FIG. 3.

As shown in FIGS. 3 to 5, the first multilayer vacuum insulating sheets 3 adjacent to each other are joined to the to-be-insulated surface 1 at least in the vicinity of the retainers 2 by pairs of first hook/loop fasteners 81 and 82 via fixed plates 14 and the base plates 12. However, in a case where the base plates 12 are eliminated, the first multilayer vacuum insulating sheets 3 may be directly joined to the to-be-insulated surface 1 by the pairs of first hook/loop fasteners 81 and 82.

In the present embodiment, in each pair of first hook/loop fasteners 81 and 82, one first hook/loop fastener 81 is attached to a corresponding one of the fixed plates 14 by rivets 16, and the other first hook/loop fastener 82 is attached to the first multilayer vacuum insulating sheets 3 by suturing.

Each of the fixed plates 14 has a circular shape, and has a diameter greater than that of the base plate 12. Each of the fixed plates 14 overlaps a corresponding one of the base plates 12, such that their centers coincide with each other. It should be noted that the shape of each fixed plate 14 need not be circular, but may be polygonal, such as rectangular or hexagonal. However, desirably, each fixed plate 14 has a symmetrical shape so that whatever attachment orientation is adopted for the attachment of the fixed plate 14, no negative impact will be caused thereby.

The first hook/loop fastener 81 has a circular shape. In the present embodiment, the first hook/loop fastener 81 is divided up into two semicircular pieces 81a and 81b. The rivets 16 are arranged on a region of the fixed plate 14, the region protruding from the base plate 12. Alternatively, the first hook/loop fastener 81 may be formed as a single circular piece.

Each fixed plate 14 is provided with a non-circular rotation prevention hole 15 at its center. The rotation prevention hole 15 has the same shape as that of the non-circular cross section portion 22 of the corresponding retainer 2. The non-circular cross section portion 22 is inserted in the rotation prevention hole 15, and thus the rotation prevention hole 15 is engaged with the non-circular cross section portion 22. The larger diameter portion 23 of the retainer 2 serves to press the fixed plate 14 against the base plate 12.

In the present embodiment, the first hook/loop fastener 82 is formed by two band-shaped pieces 82a and 82b. Each of the pieces 82a and 82b has substantially the same length as that of the first multilayer vacuum insulating sheet 3. The pieces 82a and 82b are attached to end portions of the first multilayer vacuum insulating sheets 3 in their width direction substantially over the full length of the first multilayer vacuum insulating sheets 3. Alternatively, the first hook/loop fastener 82 may be formed by four or more pieces that are intermittently arranged in two lines in the length direction of the first multilayer vacuum insulating sheets 3.

As shown in FIG. 3, FIG. 5, and FIG. 6, each second multilayer vacuum insulating sheet 4 is, between the retainers 2, joined to the first multilayer vacuum insulating sheets 3 adjacent to each other by a pair of second hook/loop fasteners 83 and 84. In the pair of second hook/loop fasteners 83 and 84, one second hook/loop fastener 83 is attached to the first multilayer vacuum insulating sheets 3 by suturing, and the other second hook/loop fastener 84 is attached to the second multilayer vacuum insulating sheet 4 by suturing.

In the present embodiment, the second hook/loop fastener 83 is formed by two band-shaped pieces 83a and 83b. Each of the pieces 83a and 83b has substantially the same length as that of the first multilayer vacuum insulating sheet 3. The pieces 83a and 83b are attached to end portions of the first multilayer vacuum insulating sheets 3 in their width direction substantially over the full length of the first multilayer vacuum insulating sheets 3. Alternatively, the second hook/loop fastener 83 may be formed by four or more pieces that are intermittently arranged in two lines in the length direction of the first multilayer vacuum insulating sheets 3.

Further, in the present embodiment, the second hook/loop fastener 84 is formed by two band-shaped pieces 84a and 84b. Each of the pieces 84a and 84b has substantially the same length as that of the second multilayer vacuum insulating sheet 4. The pieces 84a and 84b are attached to both end portions of the second multilayer vacuum insulating sheet 4 in its width direction substantially over the full length of the second multilayer vacuum insulating sheet 4. Alternatively, the second hook/loop fastener 84 may be formed by four or more pieces that are intermittently arranged in two lines in the length direction of the second multilayer vacuum insulating sheet 4. Further alternatively, the second hook/loop fastener 84 may be formed as a single piece having substantially the same size as that of the second multilayer vacuum insulating sheet 4.

As shown in FIG. 3 and FIG. 6, the third multilayer vacuum insulating sheets 5 adjacent to each other are, between the retainers 2, joined to each second multilayer vacuum insulating sheet 4 by a pair of third hook/loop fasteners 85 and 86. In the pair of third hook/loop fasteners 85 and 86, one third hook/loop fastener 85 is attached to the second multilayer vacuum insulating sheet 4 by suturing, and the other third hook/loop fastener 86 is attached to the third multilayer vacuum insulating sheets 5 by suturing.

In the present embodiment, the third hook/loop fastener 85 is formed by two band-shaped pieces 85a and 85b. Each of the pieces 85a and 85b has substantially the same length as that of the second multilayer vacuum insulating sheet 4. The pieces 85a and 85b are attached to both end portions of the second multilayer vacuum insulating sheet 4 in its width direction substantially over the full length of the second multilayer vacuum insulating sheet 4. Alternatively, the third hook/loop fastener 85 may be formed by four or more pieces that are intermittently arranged in two lines in the length direction of the second multilayer vacuum insulating sheet 4. Further alternatively, the third hook/loop fastener 85 may be formed as a single piece having substantially the same size as that of the second multilayer vacuum insulating sheet 4.

Further, in the present embodiment, the third hook/loop fastener 86 is formed by two band-shaped pieces 86a and 86b. Each of the pieces 86a and 86b has substantially the same length as that of the third multilayer vacuum insulating sheet 5. The pieces 86a and 86b are attached to end portions of the third multilayer vacuum insulating sheets 5 in their width direction substantially over the full length of the third multilayer vacuum insulating sheets 5. Alternatively, the third hook/loop fastener 86 may be formed by four or more pieces that are intermittently arranged in two lines in the length direction of the third multilayer vacuum insulating sheets 5.

A plurality of keep plates 6 for holding the first multilayer vacuum insulating sheets 3, the second multilayer vacuum insulating sheets 4, and the third multilayer vacuum insulating sheets 5 are fixed to the retainers 2. Each of the keep plates 6 is a bar-shaped member whose both end portions are engaged with the respective retainers 2 of the retainer lines that are adjacent to each other. Each keep plate 6 is made of metal, for example. In the present embodiment, the retainers 2 are arranged also in a direction orthogonal to the retainer lines. Accordingly, each keep plate 6 extends in the direction orthogonal to the retainer lines. However, as an alternative, the positions of the retainers 2 of the adjacent retainer lines may be shifted from each other, and each keep plate 6 may extend diagonally, accordingly.

Around each retainer 2, end portions of adjacent keep plates 6 overlap each other. Through-holes in which respective retainers 2 are inserted are formed in both end portions of each keep plate 6. However, instead of the through-holes, notches in which respective retainers 2 are fitted may be formed in both end portions of each keep plate 6.

In the present embodiment, each keep plate 6 is fixed to the retainers 2 by nuts 91. Each nut 91 is screwed with the second screw shaft 24 of a corresponding one of the retainers 2. A snap pin 92, which serves to prevent the nut 91 from coming off, is attached to the second screw shaft 24. It should be noted that, instead of the snap pin 92, a split pin or the like may be adopted, for example.

However, it is not essential to use the nuts 91 for fixing the keep plates 6 to the retainers 2, but various methods are adoptable for fixing the keep plates 6 to the retainers 2. For example, an annular groove continuous in the circumferential direction may be formed in each retainer 2, and an engagement piece that fits in the annular groove may be formed on each of insertion holes of the keep plates 6. In a case where each retainer 2 is a headed bolt, the keep plates 6 may be fixed to the retainers 2 by the pressing by the heads of the retainers 2.

As described above, in the thermal insulating structure of the present embodiment, the retainers 2 are disposed by utilizing the boundaries 31 between the first multilayer vacuum insulating sheets 3 and the boundaries 51 between the third multilayer vacuum insulating sheets 5. This makes it possible to reduce the number of through-holes formed in the first multilayer vacuum insulating sheets 3 and the third multilayer vacuum insulating sheets 5 (in the present embodiment, reduced to zero). In addition, in the present embodiment, each band-shaped second multilayer vacuum insulating sheet 4 is interposed between the boundary 31 between the first multilayer vacuum insulating sheets 3 and the boundary 51 between the third multilayer vacuum insulating sheets 5. Therefore, even if there is a gap between the second multilayer vacuum insulating sheet 4 and the first multilayer vacuum insulating sheets 3, the third multilayer vacuum insulating sheets 5 prevent the to-be-insulated surface 1 from being exposed through the gap and the boundary 31 between the first multilayer vacuum insulating sheets 3. Moreover, a path from the boundary 31 between the first multilayer vacuum insulating sheets 3 to the boundary 51 between the third multilayer vacuum insulating sheets 5 is formed in a manner to bypass both end portions of the band-shaped second multilayer vacuum insulating sheet 4 in its width direction, i.e., the path is formed in a labyrinth-like manner. In this way, the length of the path can be made long. This makes it possible to obtain high thermal insulating performance.

Further, according to the present embodiment, the first multilayer vacuum insulating sheets 3 can be prevented from being spaced apart from the to-be-insulated surface 1 by the first hook/loop fasteners 81 and 82. Still further, since the present embodiment is provided with the second hook/loop fasteners 83 and 84 and the third hook/loop fasteners 85 and 86, each second multilayer vacuum insulating sheet 4 serves to integrate the adjacent first multilayer vacuum insulating sheets 3 and the adjacent third multilayer vacuum insulating sheets 5 together. This makes it possible to prevent the formation of a gap between multilayer vacuum insulating sheets that overlap each other, and to prevent the multilayer vacuum insulating sheets from being displaced from each other in a direction parallel to the to-be-insulated surface 1.

Still further, in the present embodiment, each fixed plate 14, to which the first hook/loop fastener 81 is attached, is provided with the rotation prevention hole 15, and the non-circular cross section portion 22 of the corresponding retainer 2 is engaged with the rotation prevention hole 15. As a result, the retainer 2 and the fixed plate 14 are unable to rotate relative to each other. The fixed plate 14 is hard to rotate also relative to the first multilayer vacuum insulating sheets 3 owing to the first hook/loop fasteners 81 and 82. Therefore, the retainer 2 is also hard to rotate, and thus it can be expected that the retainer 2 is prevented from coming off.

Still further, in the present embodiment, the fixed plate 14 has a circular shape, and the first hook/loop fastener 81 also has a circular shape. Therefore, whatever orientation the fixed plate 14 is in, substantially the same fastening strength can be obtained between the first hook/loop fasteners 81 and 82.

Still further, in the present embodiment, since the keep plates 6 extend in a manner to traverse the third multilayer vacuum insulating sheets 5, the central portions of the first multilayer vacuum insulating sheets 3 and the central portions of the third multilayer vacuum insulating sheets 5 can also be held by the keep plates 6. In addition, each keep plate 6 can be fixed to retainers 2 by merely bringing both end portions of the keep plate 6 into engagement with the retainers 2. This makes it possible to readily fix the keep plates 6.

(Variations)

The present invention is not limited to the above-described embodiment. Various modifications can be made without departing from the spirit of the present invention.

For example, each keep plate 6 need not be a bar-shaped member, but may be a discoid member. Also, each retainer 2 may be a clamping band that can be tied to a clasp fixed to the to-be-insulated surface 1, or may be a bent metal piece.

Some or all of the first hook/loop fasteners 81 and 82, the second hook/loop fasteners 83 and 84, and the third hook/loop fasteners 85 and 86 may be eliminated.

Each boundary 31 between the adjacent first multilayer vacuum insulating sheets 3 may be covered by at least one second multilayer vacuum insulating sheet 4 longer than the distance between the retainers 2. In this case, although through-holes in which the retainers 2 are inserted need to be formed in the second multilayer vacuum insulating sheet 4, the through-holes can be readily formed in the second multilayer vacuum insulating sheet 4, which is a band-shaped sheet having a narrow width. However, if the length of each second multilayer vacuum insulating sheet 4 is shorter than the distance between the retainers 2 and the second multilayer vacuum insulating sheets 4 are adjacent to each other with each retainer 2 positioned therebetween as in the above-described embodiment, it is unnecessary to form the through-holes, in which the retainers 2 are inserted, in the second multilayer vacuum insulating sheets 4.

REFERENCE SIGNS LIST 1 to-be-insulated surface
12 base plate 13 screw hole
14 fixed plate
15 rotation prevention hole
2 retainer
21, 24 screw shaft
22 non-circular cross section portion
3 first multilayer vacuum insulating sheet
4 second multilayer vacuum insulating sheet
5 third multilayer vacuum insulating sheet
31, 51 boundary
6 keep plate
81, 82 first hook/loop fastener
83, 84 second hook/loop fastener
85, 86 third hook/loop fastener

The invention claimed is:

1. A thermal insulating structure comprising:
   at least two retainers that protrude from a to-be-insulated surface exposed to a vacuum space;
   at least two first multilayer vacuum insulating sheets that are adjacent to each other with the retainers positioned therebetween, the at least two first multilayer vacuum insulating sheets covering the to-be-insulated surface;
   at least one second multilayer vacuum insulating sheet that extends between the retainers along a boundary between the first multilayer vacuum insulating sheets in a manner to cover the boundary;
   at least two third multilayer vacuum insulating sheets that are adjacent to each other with the retainers positioned therebetween, the at least two third multilayer vacuum insulating sheets covering the first multilayer vacuum insulating sheets and the second multilayer vacuum insulating sheet; and
   a keep plate that is fixed to the retainers and holds the first multilayer vacuum insulating sheets, the second multilayer vacuum insulating sheet, and the third multilayer vacuum insulating sheets, wherein
   the first multilayer vacuum insulating sheets adjacent to each other are joined to the to-be-insulated surface at least in a vicinity of each retainer by a pair of first hook/loop fasteners,
   the second multilayer vacuum insulating sheet is, between the retainers, joined to the first multilayer vacuum insulating sheets adjacent to each other by a pair of second hook/loop fasteners, and
   the third multilayer vacuum insulating sheets adjacent to each other are, between the retainers, joined to the second multilayer vacuum insulating sheet by a pair of third hook/loop fasteners.

2. The thermal insulating structure according to claim 1, wherein
   in the pair of first hook/loop fasteners, one first hook/loop fastener is attached to a fixed plate by a rivet, the fixed plate overlapping a base plate joined to the to-be-insulated surface,
   each of the retainers includes a screw shaft and a non-circular cross section portion, the screw shaft being screwed into a screw hole formed in the base plate, the non-circular cross section portion being adjacent to the screw shaft, and
   the fixed plate is provided with a non-circular rotation prevention hole that is engaged with the non-circular cross section portion.

3. The thermal insulating structure according to claim 2, wherein
   each of the base plate and the fixed plate has a circular shape, and
   the first hook/loop fastener attached to the fixed plate has a circular shape.

4. The thermal insulating structure according to claim 1, wherein
   the at least one second multilayer vacuum insulating sheet includes three or more second multilayer vacuum insulating sheets, and
   the second multilayer vacuum insulating sheets are adjacent to each other with each retainer positioned therebetween.

5. The thermal insulating structure according to claim 1, wherein
   the retainers form a plurality of retainer lines,
   the thermal insulating structure comprises a plurality of the keep plates, and
   each of the keep plates is a bar-shaped member whose both end portions are engaged with the respective retainers of the retainer lines that are adjacent to each other.

6. A thermal insulating structure comprising:
   at least one retainer that protrudes from a to-be-insulated surface exposed to a vacuum space;
   at least two first multilayer vacuum insulating sheets that are adjacent to each other in a first direction with the retainer positioned therebetween, the at least two first multilayer vacuum insulating sheets covering the to-be-insulated surface;
   at least two second multilayer vacuum insulating sheets that are adjacent to each other in a second direction orthogonal to the first direction with the retainer positioned therebetween, the at least two second multilayer vacuum insulating sheets extending along a boundary between the first multilayer vacuum insulating sheets in a manner to cover the boundary;
   at least two third multilayer vacuum insulating sheets that are adjacent to each other in the first direction with the retainer positioned therebetween, the at least two third multilayer vacuum insulating sheets covering the first multilayer vacuum insulating sheets and the second multilayer vacuum insulating sheets; and
   a keep plate that is fixed to the retainer and holds the first multilayer vacuum insulating sheets, the second multilayer vacuum insulating sheets, and the third multilayer vacuum insulating sheets, wherein
   the first multilayer vacuum insulating sheets adjacent to each other are joined to the to-be-insulated surface at least in a vicinity of each retainer by a pair of first hook/loop fasteners,
   the second multilayer vacuum insulating sheets are joined to the first multilayer vacuum insulating sheets adjacent to each other by pairs of second hook/loop fasteners, and
   the third multilayer vacuum insulating sheets adjacent to each other are joined to the second multilayer vacuum insulating sheet by pairs of third hook/loop fasteners.

* * * * *